Aug. 22, 1967     P. G. GROFF ET AL     3,337,282

AUTOMOBILE LITTER BOX

Filed Nov. 26, 1965

INVENTORS.
PAUL G. GROFF,
JAMES E. HUEY,
BY

Berman, Davidson & Berman

ATTORNEYS.

United States Patent Office 3,337,282
Patented Aug. 22, 1967

3,337,282
AUTOMOBILE LITTER BOX
Paul G. Groff, 602 E. Guilford St., and James E. Huey,
601 S. Lincoln Ave., both of Lebanon, Pa. 17042
Filed Nov. 26, 1965, Ser. No. 509,838
14 Claims. (Cl. 312—245)

ABSTRACT OF THE DISCLOSURE

A litter box for use in an automobile or the like, which can be manually pulled or automatically driven from a concealed storage position to an extended use position. When automatically driven, an electric motor is mechanically coupled to the box through rollers for frictionally driving it between the storage and use position.

---

This invention relates to a litter box or waste receptacle and, in particular, one adapted for use in the interior of an automobile.

It is an object of this invention to provide a litter box or waste receptacle for use within the interior of an automobile, and one which can be blended into the interior and hidden from view when not in use. The provision of an unsightly and unsanitary open litter bag within the interior of the automobile, as had been common heretofore, is thus rendered unnecessary.

A still further object of this invention is to provide a litter box of the character indicated which can be both power and manually operated to move it from a stored position within an upright interior wall of the automobile to an extended use position.

A still further object of this invention is to provide an automobile litter box which is constructed and designed for use with any upright interior wall of an automobile, such as a dashboard or seat.

Another object of this invention is to provide an automobile litter box of the character described which functions with a minimum number of components, thereby requiring less maintenance and cost.

Other objects and advantages of the invention will become apparent from the following description and claims, and from the accompanying drawing, wherein:

Figure 1:
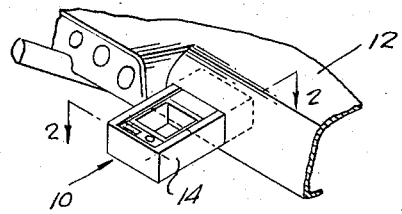
FIGURE 1 is a fragmentary perspective view illustrating the litter box comprising the subject matter of the instant invention mounted upon an automobile dashboard in extended position ready for use.

The automobile litter box consists of receptacle apparatus generally designated by the numeral 10 in FIGURE 1. As shown in FIGURE 1, the receptacle apparatus 10 is adapted to be mounted upon the dashboard 12 of an automobile.

The receptacle apparatus 10 includes a carriage box 14 mounted within the interior 16 of a housing 19 formed in the dashboard 12. The housing 19 is defined by a pair of upright side walls 19a and 19b disposed between the top and bottom of the dashboard and a rear wall 19c extending between the side walls. The housing 19 has an opening in the upright front wall of the dashboard 12 providing access to the interior 16. The side walls 19a and 19b provide lateral guidance and support for the carriage box 14.

Figure 2:
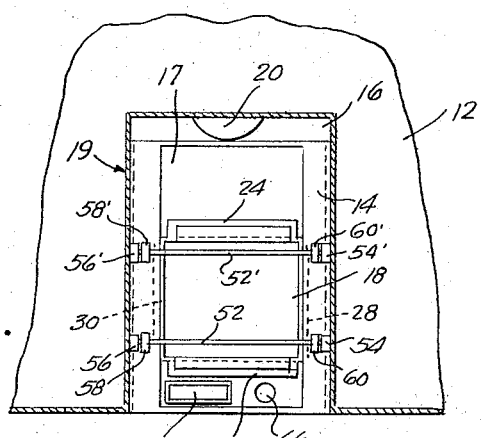
FIGURE 2 is a cross-sectional view taken substantially along the plane indicated by the line 2—2 of FIGURE 1, but with the litter box in a stored position within the dashboard of an automobile.

The carriage box 14 has a number of walls which form an enclosure which is accessible through an open top 17. The carriage box 14 is mounted within the interior 16 of the housing 19 in the dashboard 12 so as to slide from a storage position flush with the upright wall structure of the dashboard 12 (as shown in FIGURE 2) to an extended use position (as shown in FIGURE 1) exposing a litter receptacle 18 carried by the carriage box 14. The rear wall 19c of the housing includes a stop 20 for limiting rearward movement of the carriage box 14 into the interior 16, so that in its extreme rearward position, the front face of the carriage box is flush with the front upright wall of the dashboard.

The litter receptacle 18 is removably held within the enclosure formed by the walls of the carriage box 14 by means of a plurality of spring clips 24, 26, 28, and 30 arranged in a rectangular array parallel to the walls of the carriage box. Litter may be accumulated within the litter receptacle 18, and when it is full, it may be removed for emptying by simply grasping its annular lip 22 and lifting it upwardly through the opening 17 at the top of the carriage box 14. Normally, the resiliency of the spring clips 24, 26, 28, and 30 maintain the litter receptacle in firm seated engagement on the bottom wall of the carriage box 14.

As previously noted, the carriage box 14 slides from a storage position within the dashboard 12 wherein the litter receptacle 18 is completely hidden from view to an extended use position exposing the litter receptacle. The complete enclosure of the litter receptacle 18 within the dashboard 12 precludes the interior of the automobile from gaining an unsightly appearance, for example furnished by litter bags cluttering up the interior.

Figure 4:
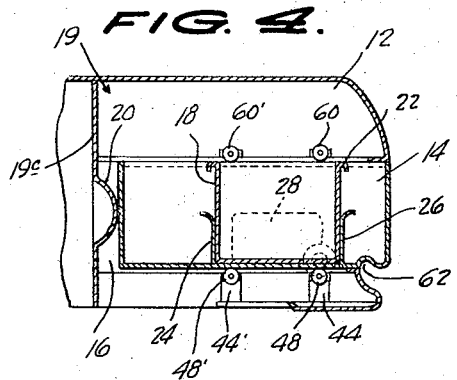
FIGURE 4 is a cross-sectional view taken substantially along the plane indicated by the line 4—4 of FIGURE 3.
Figure 3:
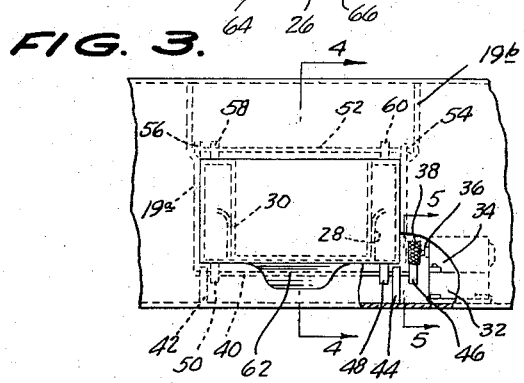
FIGURE 3 is a side view in elevation of the litter box shown in FIGURE 2.
Figure 5:
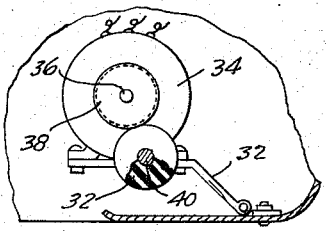
FIGURE 5 is a cross-sectional view taken substantially along the plane indicated by the line 5—5 of FIGURE 3 and illustrating in enlarged detail a portion of the drive apparatus used in conjunction with the automobile litter box.

The receptacle apparatus is also power-operated for the convenience of the occupant of the automotive vehicle. As shown specifically in FIGURES 3–5, an electric motor 34 is mounted by means of a cantilever bracket 32 secured to the bottom of the dashboard 12 within the interior of the dashboard 12. The electric motor 34 has a motor shaft 36 upon which is fixed a knurled, hard rubber roller 38.

A drive shaft 40 is mounted beneath the carriage box 14 within the interior of the dashboard 12 by means of a pair of spaced bearings 42 and 44 and extends through the wall 19b of housing 19. Secured to the drive shaft 40 at spaced points are a pair of soft rubber drive rollers 48 and 50. In addition, a soft rubber drive roller 46 is fixed to the end of the drive shaft 40 outside of housing 19, in frictional engagement with the knurled hard rubber roller 38 on the motor shaft 36. The soft rubber rollers 48 and 50 are in frictional contact with the bottom wall of the carriage box 14.

Actuation of the electric motor 34 will cause rotation of the knurled hard rubber roller 36. Rotation will be imparted by the roller 38 to the roller 46 causing the drive shaft 40 to rotate in the bearings 42 and 44. Rotation of the drive shaft 40 will cause the soft rubber rollers 48 and 50 to rotate in frictional rolling engagement with the bottom of the carriage box 14. The rotation of rollers 48 and 50 in a clockwise direction as viewed in FIGURE 4 will cause the carriage box 14 to move from its storage position (as viewed in FIGURE 2) to its extended use position (as viewed in FIGURE 1), exposing the litter receptacle 18.

Appropriate guides for movement of the carriage box 14 are furnished by providing an idler shaft 52 rotatably mounted within bearings 54 and 56 within the dashboard 12 above the carriage box 14. Fixed at spaced points to the idler shaft 62 are a pair of soft rubber idler rollers 58 and 60. Rollers 58 and 60 are in frictional rolling engagement with a top surface portion of the carriage box 14.

Parallel to the shaft 52, in the same horizontal plane, is a second idler shaft 52'. The shaft 52' is rotatably mounted within bearings 54' and 56' above the carriage box 14 and includes spaced rollers 58' and 60' in rolling frictional contact with the top surface of the carriage box 14.

Spaced from the drive shaft 40 in the same horizontal plane is a third idler shaft designated by the numeral 48'. Similar to the mounting of the drive shaft 40, the shaft 48' is rotatably mounted within a pair of spaced bearings (not shown) within the dashboard beneath the carriage box 14 and has connected thereto a pair of spaced soft rubber rollers (not shown) in frictional contact with the bottom surface of the carriage box 14 for added guidance and support of the carriage box during its sliding movement.

The electric motor 34 is adapted to be actuated by means of a push button in a conventional manner, as, for example, in a manner identical to power operated windows in an automobile.

The carriage box 14 and the litter receptacle 18 can also be manually disposed in its extended use position from its storage position within the dashboard 12. For this purpose, a finger hold 62 is provided in the dashboard and the bottom portion of the carriage box 14. (See FIGURE 4.) An automobile occupant can grasp the carriage box 14 by means of the finger hold and pull the carriage box 14 forward over the rollers on the drive and idler shafts. It could also be pushed back in a similar manner. If desired, the electric motor 30 can be of the reversible type, as used in connection with a power window drive, to automatically retract the carriage box 14 and litter receptacle 18 into their stored positions.

The automobile litter box could include, as shown in FIGURE 2, an ashtray 64 and lighter 66 mounted in the forward portion of the receptacle apparatus, in order to conserve space, and also to render the ashtray and lighter automatically accessible.

Figure 6:
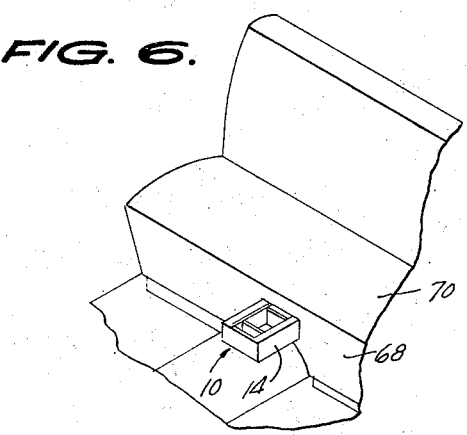
FIGURE 6 illustrates still another disposition of the automobile litter box comprising the subject of the instant invention and, in particular, illustrates the litter box mounted upon an upright wall of an interior automotive vehicle seat.

With specific reference to FIGURE 6, it will be appreciated that the receptacle apparatus 10 may be mounted in a similar manner upon the lower upright portion of an interior automotive vehicle seat 70, in lieu of the dashboard 12. In fact, the receptacle apparatus 10 can be mounted upon any upright wall within the interior of the automotive vehicle.

While specific embodiments of the present invention have been disclosed in the foregoing description, it will be understood that various modifications within the spirit of the invention may occur to those skilled in the art. Therefore, it is intended that no limitations be placed on the invention except as defined by the scope of the appended claims.

We claim:

1. Receptacle apparatus for use with an upright wall structure comprising a receptacle for receiving litter, carriage means removably receiving said litter receptacle adapted to be mounted to move from a storage position within said wall structure and enclosing said litter receptacle therein to an extended use position exposing said litter receptacle, and electrically actuated means operatively connected to said carriage means for frictionally driving said carriage means from said storage position to said use position.

2. Receptacle apparatus in accordance with claim 1 wherein said upright wall structure is a vehicle dashboard.

3. Receptacle apparatus in accordance with claim 1 wherein said upright wall structure is a portion of a vehicle seat.

4. Receptacle apparatus in accordance with claim 1 wherein said carriage means includes a plurality of upwardly extending resilient clips for removably receiving said litter receptacle.

5. Receptacle apparatus in accordance with claim 1 wherein said electrically actuated means includes electric motor means, a rotatably mounted drive shaft, spaced rollers mounted on said drive shaft in frictional contact with said carriage means, and means drivingly coupling said electric motor means to said drive shaft.

6. Receptacle apparatus for use with an upright wall structure comprising a receptacle for receiving litter, carriage means removably receiving said litter receptacle adapted to be mounted to move from a storage position within said wall structure and enclosing said litter receptacle therein to an extended use position exposing said litter receptacle, and means operatively connected to said carriage means for moving said carriage means from said storage position to said use position, said last named means being an electrically actuated mechanism adapted to be housed within said wall structure, said electrically actuated mechanism including electric motor means, a rotatably mounted drive shaft beneath said carriage means, spaced rollers mounted on said drive shaft in frictional contact with said carriage means, means drivingly coupling said electric motor means to said drive shaft, an idler shaft is rotatably mounted above said carriage means and disposed substantially parallel to said drive shaft, and spaced rollers are mounted on said idler shaft in frictional contact with said carriage means.

7. Receptacle apparatus in accordance with claim 1 wherein said carriage means includes a plurality of upwardly extending resilient clips for removably receiving said litter receptacle.

8. In combination with an upright, interior wall structure of an automotive vehicle, receptacle apparatus mounted upon said wall structure, said receptacle apparatus including a receptacle for receiving litter, carriage means removably receiving said litter receptacle mounted upon said wall structure for sliding movement from a storage position flush with said wall structure and enclosing said litter receptacle therein to an extended use position exposing said litter receptacle, and electrically actuated means operatively connected to said carriage means for frictionally driving said carriage means from said storage position to said use position.

9. In combination with an upright, interior wall structure of an automotive vehicle, receptacle apparatus mounted upon said wall structure, said receptacle apparatus including a receptacle for receiving litter, carriage means removably receiving said litter receptacle mounted upon said wall structure for sliding movement from a storage position flush with said wall structure and enclosing said litter receptacle therein to an extended use position exposing said litter receptacle, and electrically actuated mechanical means operatively connected to said carriage means for sliding said carriage means from said storage position to said use position, said electrically operated mechanical means being housed within said wall srtucture and including electric motor means, a rotatably mounted drive shaft, spaced rollers mounted on said drive shaft in frictional contact with said carriage means, and means drivingly coupling said electric motor means to said drive shaft.

10. The combination of claim 9 wherein said drive shaft is mounted below said carriage means, an idler shaft is rotatably mounted above said carriage means and disposed substantially parallel to said drive shaft, and spaced rollers mounted on said idler shaft in frictional contact with said carriage means.

11. The combination of claim 9 wherein said carriage means includes a plurality of upwardly extending resilient clips for removably receiving said litter receptacle.

12. The combination of claim 10 wherein said carriage means includes a plurality of upwardly extending resilient clips for removably receiving said litter receptacle.

13. The combination of claim 9 wherein said upright wall structure is a vehicle dashboard.

14. The combination of claim 9 wherein said upright wall structure is a portion of a vehicle seat.

References Cited

UNITED STATES PATENTS

| | | | |
|---|---|---|---|
| 1,740,514 | 12/1929 | Kimball | 206—19.5 |
| 2,946,637 | 7/1960 | Bocker | 312—223 |
| 3,082,863 | 3/1963 | Oharenko | 206—19.5 |
| 3,084,789 | 4/1963 | Kirby | 206—19.5 |

CASMIR A. NUNBERG, *Primary Examiner.*